United States Patent
Deguchi

(10) Patent No.: US 11,990,794 B2
(45) Date of Patent: May 21, 2024

(54) STATOR

(71) Applicant: TOYOTA JIDOSHA KABUSHIKI KAISHA, Toyota (JP)

(72) Inventor: Junichi Deguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/717,373

(22) Filed: Apr. 11, 2022

(65) Prior Publication Data

US 2022/0352770 A1 Nov. 3, 2022

(30) Foreign Application Priority Data

Apr. 28, 2021 (JP) .................. 2021-075760

(51) Int. Cl.
 *H02K 1/18* (2006.01)
 *H02K 1/16* (2006.01)
 *H02K 15/02* (2006.01)

(52) U.S. Cl.
 CPC .............. *H02K 1/18* (2013.01); *H02K 1/16* (2013.01); *H02K 15/024* (2013.01)

(58) Field of Classification Search
 CPC ............ H02K 1/18; H02K 1/16; H02K 15/024
 USPC ....... 310/216.007, 216.008, 216.009, 156.61, 310/216.114, 400
 See application file for complete search history.

(56) References Cited

FOREIGN PATENT DOCUMENTS

| CN | 107394910 A | * | 11/2017 |
|----|-------------|---|---------|
| JP | 2004-236415 A | | 8/2004 |
| JP | 2005080432 A | * | 3/2005 |
| JP | 2006-211846 A | | 8/2006 |
| JP | 2015-144499 A | | 8/2015 |
| JP | 2019-068567 A | | 4/2019 |
| JP | 2019068694 A | * | 4/2019 |

* cited by examiner

*Primary Examiner* — Jose A Gonzalez Quinones
(74) *Attorney, Agent, or Firm* — Oliff PLC

(57) ABSTRACT

Provided is a stator including a stator core composed of an annular core back and teeth projecting from the inner circumference side of the core back, and an end plate for clamping and pressing at least one end side of the core back and the teeth in the axial direction.

3 Claims, 5 Drawing Sheets

A-A CROSS SECTION

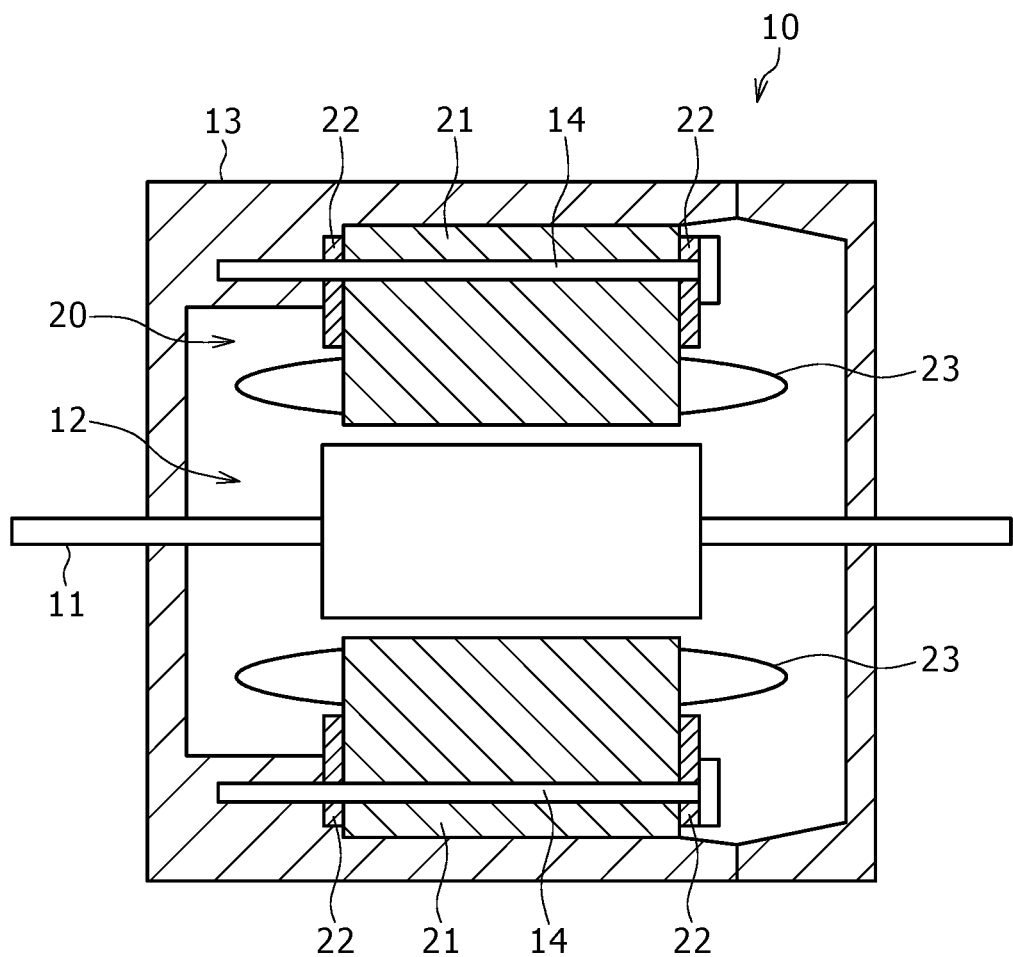
F I G . 1

A-A CROSS SECTION

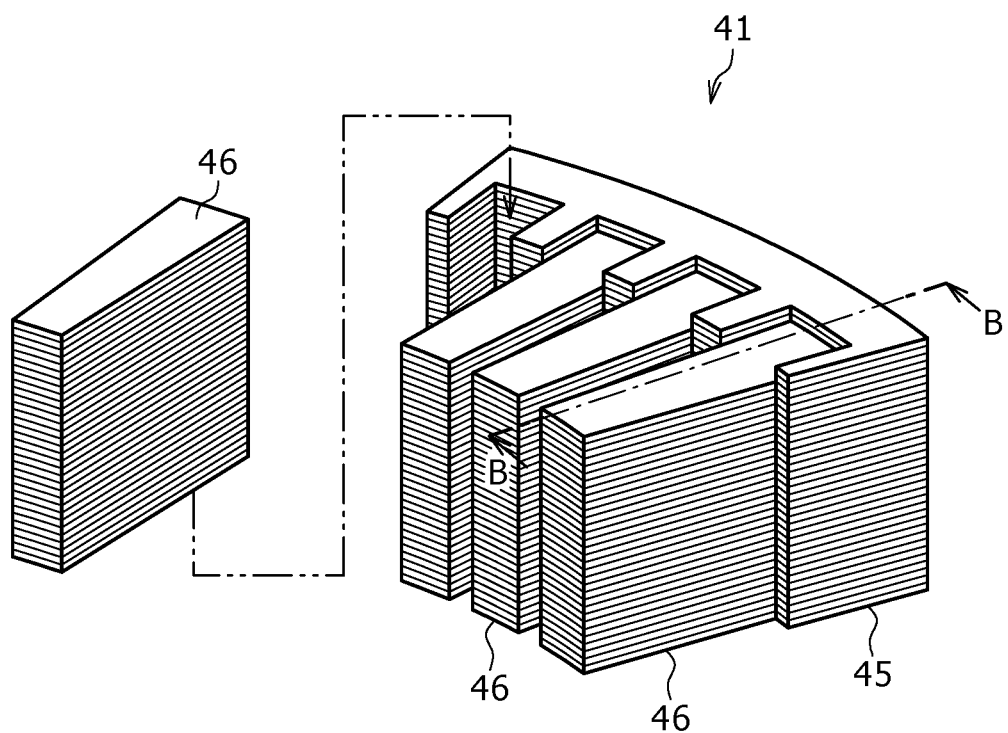
F I G . 5A
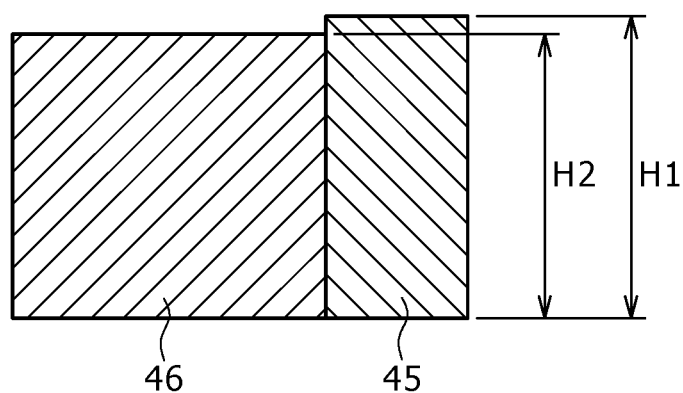
B-B CROSS SECTION
F I G . 5B

STATOR

CROSS REFERENCE TO RELATED APPLICATION

This application claims priority to Japanese Patent Application No. 2021-075760 filed on Apr. 28, 2021, which is incorporated herein by reference in its entirety including the specification, claims, drawings, and abstract.

TECHNICAL FIELD

The present disclosure relates to a stator including a stator core composed of a core back and teeth.

BACKGROUND

A stator is a stationary portion of a rotary electric machine, and includes a stator core composed of laminated steel plates and a stator coil wound around the stator core. The stator core includes an annular back yoke (core back), and teeth projecting from the inner circumference side of the back yoke.

A divided stator core (a divided core) is composed of, for example, a separate back yoke and multiple teeth. JP 2019-068567A discloses a divided core including an annular back yoke having a plurality of concavities formed along its inner circumference, and teeth whose end bases are fit in the respective concavities.

SUMMARY

A stator core is securely accommodated in the case of a rotary electric machine by means of shrink-fitting or the like. In the above, a pressing force in the diameter direction acts on the stator core due to press-fitting into the case, which generates an in-plane stress in the stator core. This increases the iron loss of the stator core.

When the above-described stator core composed of a separate core back and multiple teeth is securely accommodated in the case through press-fitting, an in-plane stress is generated in each of the core back and the teeth. This increases the iron loss of the stator core.

In view of the above, the present disclosure aims to provide a stator having a stator core composed of a separate core back, and multiple teeth that respectively have a smaller iron loss.

A stator according to the present disclosure includes a stator core composed of a separate annular core back, and multiple teeth projecting from the inner circumference side of the core back; and an end plate for clamping and pressing the core back and the teeth in the axial direction.

In the stator according to the present disclosure, preferably, the core back may have a larger iron loss than the teeth, and the face of the end plate for clamping and pressing the core back may project further towards the stator core than does the face of the end plate for clamping and pressing the teeth.

In the stator according to the present disclosure, preferably, the core back may have a larger iron loss than the teeth, and the length of the core back in the axial direction before the core back is clamped and pressed with the end plate may be longer than that of the teeth before the teeth are clamped and pressed with the end plate.

A stator according to the present disclosure generates an out-of-plane stress in each of the core back and teeth of a stator core composed of a separate core back and multiple teeth, to thereby reduce the iron loss of each of the core back and of the teeth.

BRIEF DESCRIPTION OF THE DRAWINGS

Embodiment(s) of the present disclosure will be described based on the following figures, wherein:

FIG. 1 is a schematic view of a rotary electric machine according to an embodiment;

FIG. 5A is a perspective view of another exemplary stator of the embodiment; and FIG. 5B is a cross sectional view of the stator in FIG. 5A along line BB.

DESCRIPTION OF EMBODIMENTS

An embodiment of the present disclosure will now be described in detail. Note that specific shapes, materials, directions, numeric values, or the like in the description below are only examples to facilitate understanding of the present disclosure, and can be arbitrarily changed depending on the usage, purpose, specifications, and so forth.

Figure 2:
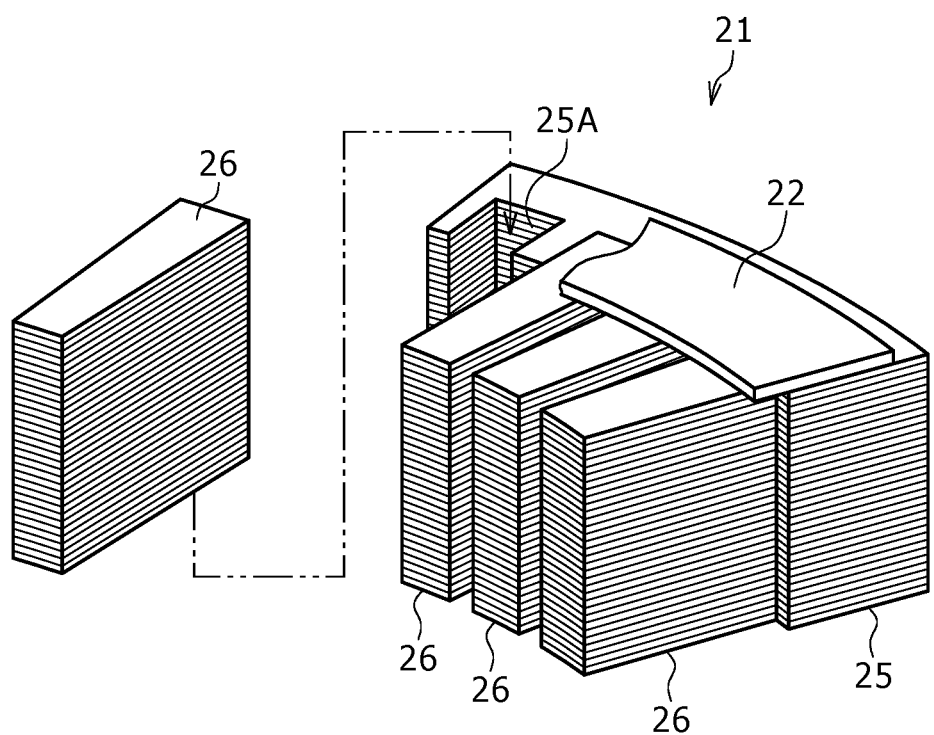
FIG. 2 is a perspective view of an exemplary stator of the embodiment.

Referring to FIG. 1 and FIG. 2, a rotary electric machine 10 having an exemplary stator 20 according to this embodiment will be described. FIG. 1 is a schematic view of the rotary electric machine 10. FIG. 2 is a perspective view of a stator core 21 of the stator 20. The description below is made with reference to a circumferential direction and a diameter direction defined based on a rotational shaft 11 of the rotary electric machine 10 being an axial direction.

The rotary electric machine 10 is a device having the stator 20 according to the present disclosure. The rotary electric machine 10 is to be mounted on electric vehicles, such as hybrid vehicles, pure electric vehicles, and so forth. The rotary electric machine 10 functions as a motor with power supplied from a battery (not illustrated) when power-running to drive the wheels of the electric vehicle, and as a generator when braking to recover regenerative energy to charge the battery.

The rotary electric machine 10 includes the rotational shaft 11, a rotor 12 or a rotator securely mounted on the rotational shaft 11, the stator 20, or a stator for generating rotation moment through cooperation with the rotor 12, a case 13 for housing the rotational shaft 11, the rotor 12, and the stator 20, and a plurality of bolts 14 for securing the stator core 21, to be described later, in the case 13.

The rotor 12 has a plurality of permanent magnets (not illustrated) thereon. The rotor 12 rotates relative to the stator 20 with electromagnetic force that is generated in a stator coil 23 with a drive current supplied to the stator coil 23 to be described later.

The stator 20 generates rotational moment through cooperation with the rotor 12, as described above. The stator 20 can reduce the iron loss of the stator core 21 by clamping and pressing both end portions of a core back 25 and teeth 26 of the stator core 21, to be described later, in the axial direction with an end plate 22, as to be described later in detail.

The stator 20 is composed of the stator core 21 composed of laminated steel plates, the end plate 22 disposed at least on one end side (both end sides in this example) in the axial direction of the stator core 21, and the stator coil 23 residing in slots of the stator core 21 so as to wind around the stator core 21 (each slot being a space between adjacent teeth 26, to be described later, in the circumferential direction).

As illustrated in FIG. 2, the stator core 21 is formed by laminating thin steel plates, as described above, and has a plurality of slots formed on its inner side, with the stator coil 23 residing in the slots. The stator core 21 has the annular core back 25, and teeth 26 projecting from the inner circumference side of the core back 25.

The stator core 21 is composed of the separate core back 25 and multiple teeth 26. In other words, the stator core 21 can be decomposed into the core back 25 and the teeth 26. In more detail, the stator core 21 has a plurality of concavities 25A formed along the inner circumference of the core back 25, and the end base portion of each tooth 26 is fit into the respective concavity 25A.

The end plate 22 is a non-magnetic annular plate. The end plate 22 is disposed on both end portions of the stator core 21 in the axial direction so as to straddle the core back 25 and the teeth 26 in the diameter direction. The end plate 22, together with the stator core 21, is fastened to the case 13 with the bolts 14, to be described later.

With the stator core 21 and the end plate 22 secured in the case 13, the end plate 22 clamps and presses the stator core 21, whereby a pressing force in the axial direction acts on the laminate stator core 21. In other words, the core back 25 and the teeth 26 are clamped and pressed with the end plate 22, whereby a pressing force in the axial direction acts on the core back 25 and the teeth 26. This generates an out-of-plane stress in the core back 25 and the teeth 26, to be described later in detail, which can reduce the iron loss of the stator core 21.

Each of the bolts 14 penetrates a through hole of the stator core 21 and that of the end plate 22 to be threaded in the case 13, whereby the stator core 21, the end plate 22, and the case 13 are fastened to thereby secure the stator core 21 and the end plate 22 to the case 13.

Figure 3:
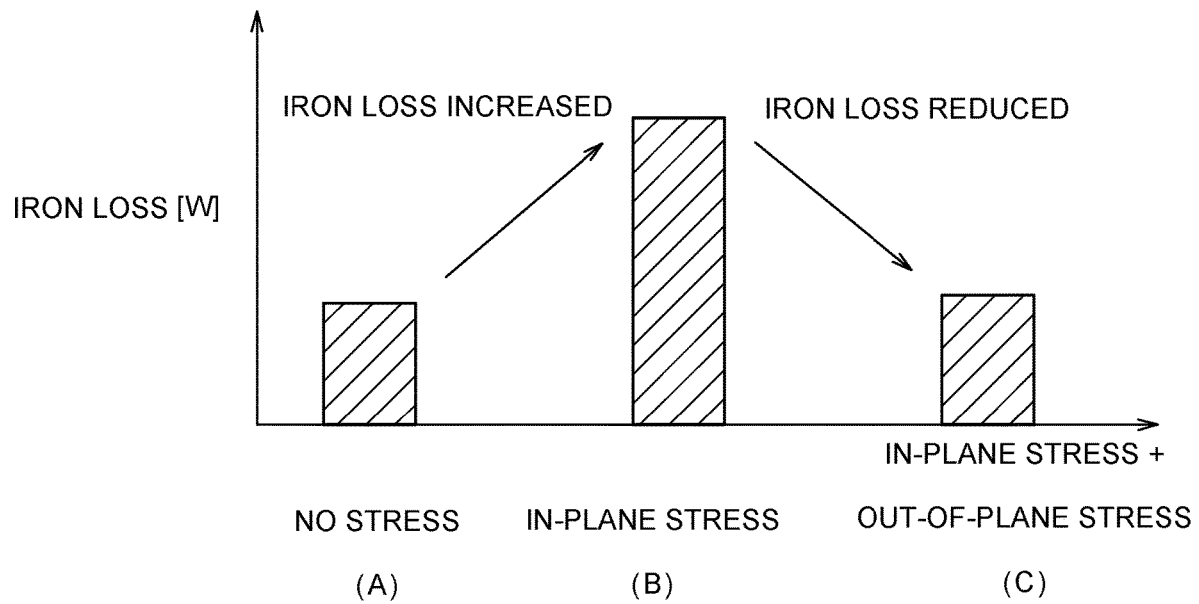
FIG. 3 is a graph exhibiting the relationship between in-plane stress, out-of-plane stress, and iron loss of a stator core.

Referring to FIG. 3, the relationship between in-plane stress, out-of-plane stress, and the iron loss of the stator core 21 will be described.

As the graph in FIG. 3A exhibits, the stator core 21 has iron loss attributed to its material before being secured in the case 13.

The stator core 21 is secured in the case 13 with shrink-fitting, or the like. With pressing, a pressing force in the diameter direction acts on the stator core 21, which generates an in-plane stress. Note here that an in-plane stress is a stress generated in the plane of a steel plate due to a pressing force acting in the diameter direction of the steel plate. As the graph in FIG. 3B exhibits, an in-plane stress generated in the stator core 21 increases the iron loss of the stator core 21.

As the graph in FIG. 3C exhibits, it is confirmed that an out-of-plane stress generated in the stator core 21 reduces the iron loss. Note here that an out-of-plane stress is a stress generated in the plane of a steel plate due to a pressing force acting in the axial direction of the steel plate. Thus, applying a pressing force acting in the axial direction to the stator core 21 subjected to an in-plane stress to thereby generate an out-of-plane stress can reduce the iron loss of the stator core 21.

In this example, in the case where the stator core 21 composed of a separate core back 25 and multiple teeth 26, and the end plate 22 are secured in the case 13, the core back 25 and the teeth 26 are clamped and pressed with the end plate 22, whereby a pressing force in the axial direction acts on the core back 25 and the teeth 26. This generates an out-of-plane stress in the core back 25 and the teeth 26, whereby the iron loss of each of the core back 25 and the teeth 26 can be reduced. Consequently, the iron loss of the stator core 21 can be reduced.

In the following, there will be described an example in which the core back 25 and the teeth 26 of the stator core 21 are made of different kinds of materials, and thus have different magnitudes of iron loss. In more detail, the iron loss of the core back 25 of the stator core 21 is larger than that of the teeth 26. In this example, the core back 25 is preferably made of electromagnetic steel plates, and the teeth 26 are preferably made of amorphous metal or nanocrystalline material.

In the example described below, the iron loss of the core back 25 of the stator core 21 composed of a separate core back 25 and multiple teeth 26, as described above, is larger than that of the teeth 26, and the reduction of this large iron loss of the core back 25 is greater than that of the teeth 26.

Figure 4A:
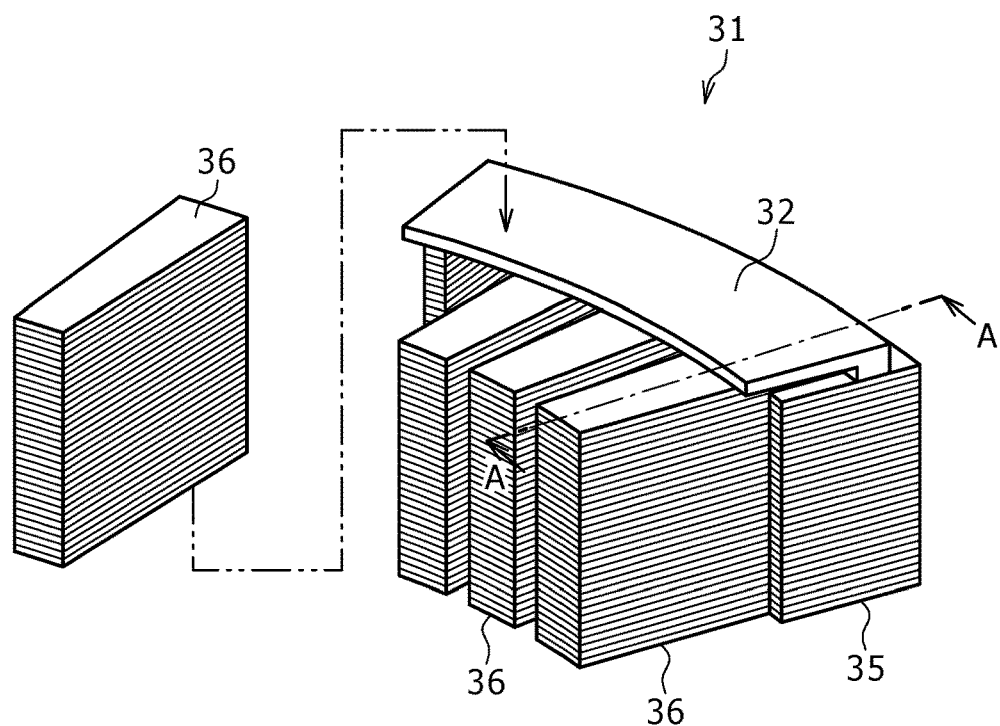
FIG. 4A is a perspective view of another exemplary stator of the embodiment.
Figure 4B:
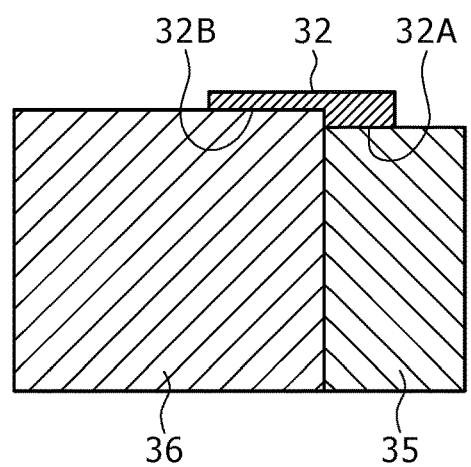
FIG. 4B is a cross sectional view of the stator in FIG. 4A along line AA.

Referring to FIG. 4A and FIG. 4B, another exemplary stator according to this embodiment will be described in detail. FIG. 4A is a perspective view of a stator core 31. FIG. 4B is a cross sectional view of the stator core 31 along line AA in FIG. 4A.

Specifically, the stator includes the stator core 31 composed of laminated steel plates, and end plates 32 disposed on the respective end sides of the stator core 31 in the axial direction, as described above. The stator core 31 is composed of a separate core back 35 and multiple teeth 36, as described above.

The end plate 32 has a face to be opposed to the stator core 31. The face is composed of an opposed face 32A for clamping and pressing the core back 35, and an opposed face 32B for clamping and pressing the teeth 26. The opposed face 32A and the opposed face 32B are formed stepwise. Specifically, the opposed face 32A projects further toward the stator core 31 than does the opposed face 32B.

With the above-described structure, in the case where the stator core 31, the end plate 32, and the case 13 are fastened to each other with the bolts 14 (refer to FIG. 1), and where the end plate 32 applies a pressing force in the axial direction of the stator core 31, the core back 35 is compressed more than the teeth 36 are. This generates a larger out-of-plane stress in the core back 35 than in the teeth 26.

Note that the difference in height, or a step difference, between the opposed face 32A and the opposed face 32B of the end plate 32 is illustrated exaggeratedly large, as is the step difference between the core back 35 and teeth 36, which results in clamping and pressing.

In the above, as the iron loss of the core back 35 is larger than that of the teeth 36, a larger out-of-plane stress is generated in the core back 35 than in the teeth 36, thereby generating an out-of-plane stress having a magnitude corresponding to the magnitude of the iron loss. This can reduce the iron loss by an extent corresponding to the magnitude of the iron loss.

This manner of formation of the opposed faces 32A, 32B; specifically, a formation in which the opposed face 32A of the end plate 32 for clamping and pressing the core back 35 projects further toward the stator core 31 than the opposed face 32B of the end plate 32 for clamping and pressing the teeth 36, enables larger reduction of the iron loss of the core back 35, which has a larger iron loss than that of the teeth 36, than for the teeth 36.

Referring to FIG. 5A and FIG. 5B, another exemplary stator according to this embodiment will be described in detail. FIG. 5A is a perspective view of a stator core 41. FIG. 5B is a cross sectional view of the stator core 41 along line BB in FIG. 5A.

Similar to the above-described embodiment, a stator includes the stator core 41 composed of laminated steel plates, and end plates 42 (not illustrated) disposed on the respective ends in the axial direction of the stator core 41. The stator core 41 is composed of a separate core back 45 and multiple teeth 46, as described above.

In the stator core 41, the length (height H1) of the core back 45 in the axial direction before the stator core 41 is secured in the case 13; that is, before the core back 45 is clamped and pressed with the end plate 42, is longer than that (height H2) of the teeth 46 in the axial direction before the teeth 46 are clamped and pressed with the end plate 42.

With the above-described structure, when the stator core 41, the end plate 42, and the case 13 are fastened with the bolts 14 (refer to FIG. 1) and a pressing force acts on the stator core 41 in the axial direction with the end plate 42, the core back 45 is compressed more than the teeth 46 are. That is, a larger out-of-plane stress is generated in the core back 45 than in the teeth 46.

In the above, as the iron loss of the core back 45 is larger than that of the teeth 46, as described above, an out-of-plane stress larger than that generated in the teeth 46 is generated in the core back 45, whereby an out-of-plane stress in magnitude corresponding to the magnitude of an iron loss is generated, which can reduce the iron loss by an extent corresponding to the magnitude of the iron loss.

That is, the length of the core back 45 in the axial direction before the core back 45 is clamped and pressed with the end plate 42 is longer than that of the teeth 46 before the teeth 46 are clamped and pressed with the end plate 42, whereby the reduction in iron loss of the core back 45, which is larger than that of the teeth 46, can be greater than that of the teeth 46.

Note that the difference in height between the core back 45 and the teeth 46 before the stator core 41 is clamped and pressed are illustrated exaggeratedly large in FIG. 5A and FIG. 5B.

The present disclosure is not limited to the above-described embodiment and its modified examples, but can be modified or improved in various manners within the range defined in the claims of this application.

The invention claimed is:

1. A stator, comprising:
   a stator core composed of a separate annular core back and multiple teeth projecting from an inner circumference side of the core back; and
   an end plate for clamping and pressing the core back and the teeth in an axial direction,
   wherein a first face of the end plate that faces the stator core for clamping and pressing the core back projects further towards an axial center of the stator core than does a second face of the end plate that faces the stator core for clamping and pressing the teeth.

2. The stator according to claim 1, wherein
   the core back has a larger iron loss than that of the teeth.

3. The stator according to claim 1, wherein
   the core back has a larger iron loss than that of the teeth, and
   a length of the core back in the axial direction before the core back is clamped and pressed with the end plate is longer than that of the teeth before the teeth are clamped and pressed with the end plate.

* * * * *